P. G. KAISER.
MACHINE FOR FORMING PAPER TUBES.
APPLICATION FILED SEPT. 9, 1910.
1,034,915.
Patented Aug. 6, 1912.
2 SHEETS—SHEET 2.
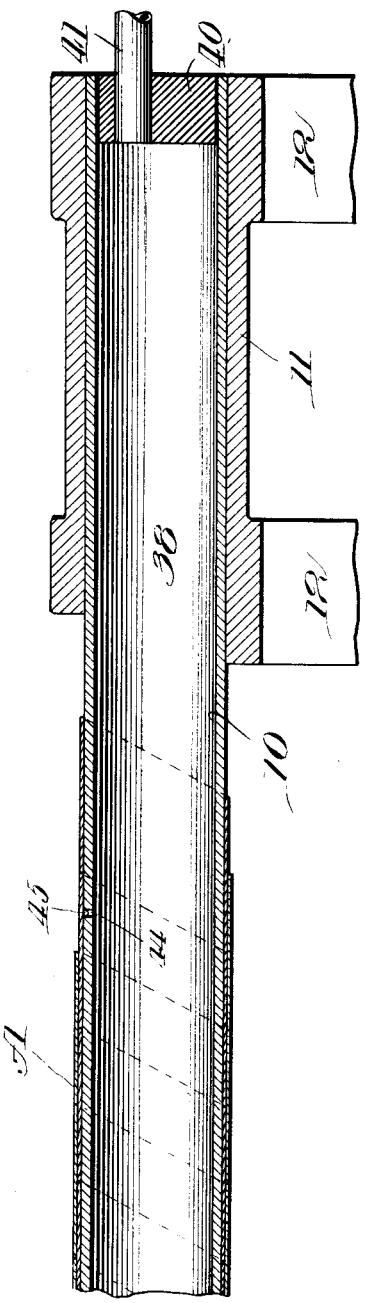
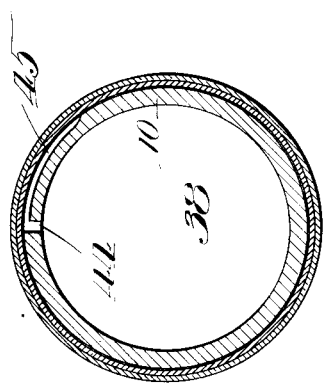
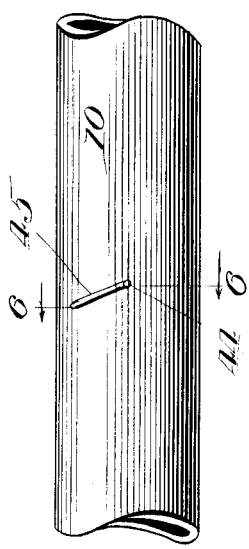
Witnesses:
Harry S. Gaither
William Goldberger
Inventor
Paul G. Kaiser
by William L. Hall
Atty

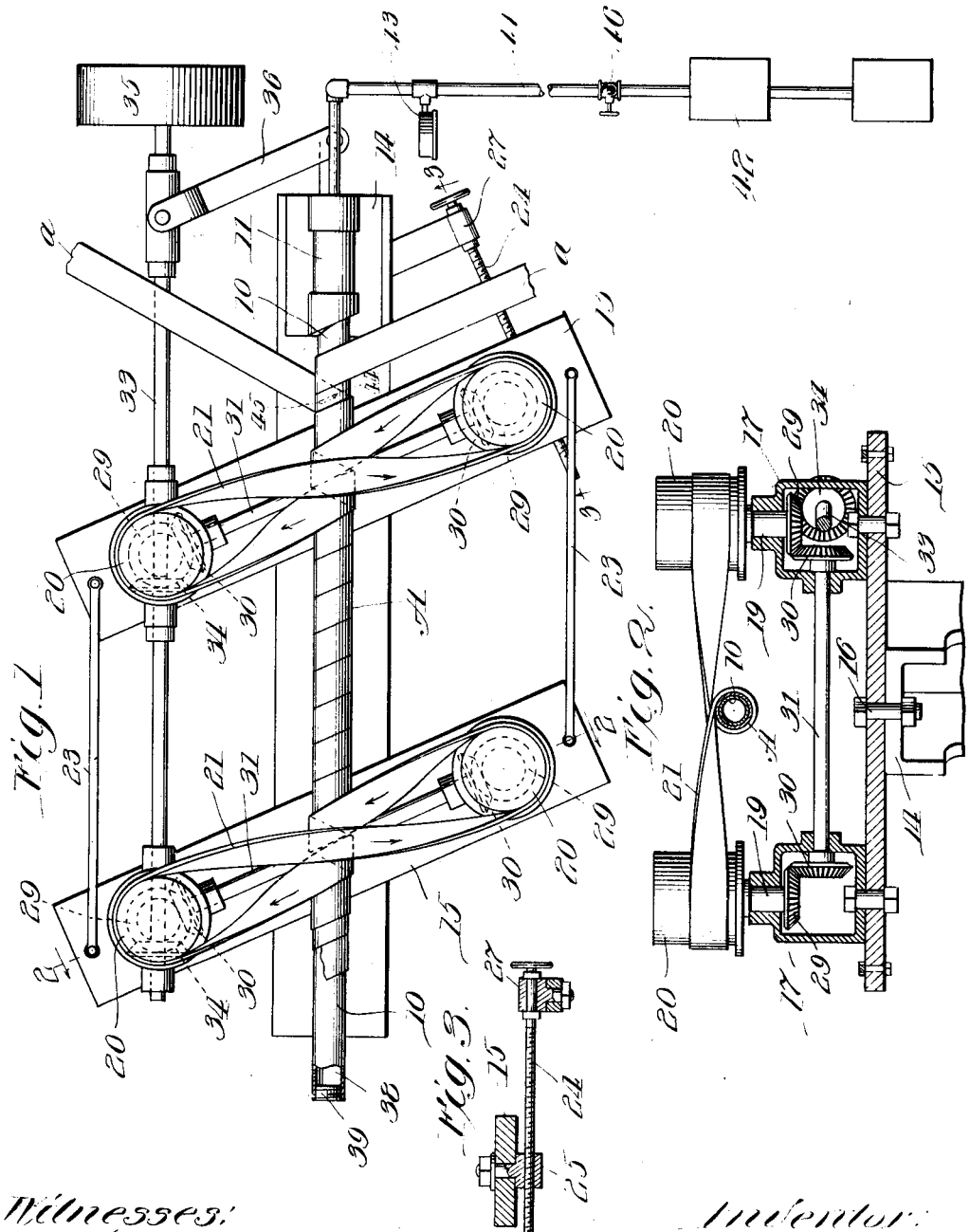

UNITED STATES PATENT OFFICE.

PAUL GUSTAV KAISER, OF CHICAGO, ILLINOIS.

MACHINE FOR FORMING PAPER TUBES.

1,034,915.

Specification of Letters Patent.

Patented Aug. 6, 1912.

Application filed September 9, 1910. Serial No. 581,257.

*To all whom it may concern:*

Be it known that I, PAUL G. KAISER, a citizen of the United States, and a resident of Chicago, in the county of Cook and State of Illinois, have invented certain new and useful Improvements in Machines for Forming Paper Tubes; and I do hereby declare that the following is a full, clear, and exact description thereof, reference being had to the accompanying drawings, and to the characters of reference marked thereon, which form a part of this specification.

This invention relates to an improved apparatus for making tubes from paper board or like material, and the invention refers more specifically to novel means for reducing or overcoming the friction between the forming member or mandrel and the tube which is formed thereover and which is continuously advanced endwise of the mandrel to clear or remove the tube therefrom.

In forming the tube on a forming member or mandrel the material from which said tube is made is applied to, and formed into a tube about, the mandrel and is advanced therealong to remove it from the mandrel and a mobile anti-friction medium is introduced under pressure into the space between the tube and the mandrel or forming member so as to form between the mandrel and the tube a thin film, the interposition of which between the mandrel and the tube prevents the tube material from clinging to the mandrel in such manner as to generate friction between the parts, whereby the tube may be advanced freely and without retardation along the mandrel.

A machine embodying my improvements may comprise the usual forming mandrel, about which are wrapped the strips from which the tube is made, combined with means, such as a belt or belts wound spirally thereon, for forming the strips into a tube and for advancing the tube along the mandrel. There is provided near the point where the strips are wrapped about the mandrel means for delivering a mobile anti-friction medium between the moving tube and the mandrel, the supply of the anti-friction medium being continuous and under pressure. The said mandrel may be made hollow to receive the anti-friction medium and be connected to a pump of suitable character to force the anti-friction medium therein and the mandrel may be provided with an opening to afford passage for the anti-friction medium from the hollow or chambered portion to the exterior of the mandrel to deliver said medium to the space between the mandrel and said moving tube. The anti-friction medium thus applied may be air or may be any other suitable neutral, readily flowable or mobile medium. For instance, in some instances such medium may take the form of a water proofing material having sufficient lubricating properties to overcome the friction between the moving tube and mandrel.

The overcoming or reduction of the friction between the moving tube and the mandrel avoids the generation of heat in the mandrel, which occurs, especially near the outer end thereof, when the tube moves with a close frictional engagement over the mandrel. Such heating of the outer end of the mandrel in prior methods of forming these tubes results in a substantial increase of diameter of the mandrel, with the effect of an increased friction between the mandrel and the tube, and it often occurs that the heating of the mandrel and its consequent enlargement has the effect to arrest the movement of the tube over the mandrel until the latter is allowed to cool down. In order to overcome this defect in prior methods and machines, it has been the practice to apply a lubricant, such as tallow, either to strips from which the tube is formed or to the mandrel. The application of said lubricant has not been found to be wholly successful in overcoming the friction between the tube and the mandrel, especially when the mandrel is of considerable length. Furthermore such prior method of reducing the friction between the mandrel and tube is open to the additional objection that the lubricant is applied to and remains on the inner surface of the tube, where its presence, for many uses of the tube, is objectionable.

As shown in the drawings,—Figure 1 is a plan view of a tube forming machine embodying my improvements, showing a tube thereon. Fig. 2 is a vertical section taken in the oblique plane indicated by section line 2—2 of Fig. 1, with parts in elevation. Fig. 3 is a section on line 3—3 of Fig. 1. Fig. 4 is an enlarged axial section of the hollow mandrel, near the end thereof which receives the tube forming material, showing the mounting for the mandrel and showing a partially formed tube thereon. Fig. 5 is a plan view of the mandrel, showing the passage therein through which the mobile anti-friction medium passes from the chambered mandrel to the exterior thereof. Fig. 6 is an enlarged section on line 6—6 of Fig. 5, showing the tube thereon.

In said drawings, 10 designates the mandrel on which the tube is formed. Said mandrel is herein shown as fixed or stationary and is supported at the forward end of the machine in a sleeve 11 that is supported on the upper ends of standards 12 which rise from the base 14 of the machine. Said base extends longitudinally beneath the mandrel and the mandrel is free or non-supported at its rear end to permit the tubes to be freely removed therefrom.

15, 15 designate horizontally arranged frames which are supported obliquely over the base 14 and are pivotally connected intermediate their ends to the base, as by the bolts 16, whereby the said members 15 may swing horizontally to adjust the angle thereof relatively to the base. Rotatively mounted in bearings 17, 17 at the outer ends of said frames are vertical shafts 19, 19 which carry at their upper ends pulleys 20, 20 about which are trained the tube forming and advancing belts 21, 21. There are two of these tube forming and advancing belts, supported as described, arranged, one near the front and the other near the rear end of the machine. One lap of each belt passes over or above the mandrel, while the other lap thereof is wrapped spirally about the mandrel, by reason of the oblique relation of the belt supporting frames to the mandrel, and said belts are driven in the direction indicated by the arrows in Fig. 1, by driving means hereinafter described to rotate the forming tube about the mandrel and to advance the same toward the rear end thereof. The said belt supporting frames 15 are connected at their ends by links 23 to maintain the frames in parallelism. The frames are adapted to be simultaneously swung about their pivots 16, to vary their obliquity to the mandrel, through the medium of a screw-threaded shaft 24 which engages a nut 25 loosely carried by one end of the forwardmost belt supporting frame, and rotatively mounted at its forward end in the upper end of a standard 27 that is suitably supported on the forward end of the machine, in the manner shown in Fig. 1.

The pulley shafts 19 are provided at their lower ends with beveled gears 29, 29 and said gears 29, 29 of each frame are connected by other bevel gears 30, 30 and a rotary shaft 31, arranged above the frames 15, whereby the pulleys are equally and simultaneously rotated. The said pulley driving gears are driven through the medium of a horizontal drive shaft 33 arranged at one side of the machine and provided with beveled gears 34, 34 which mesh with the gears 29, 29 of the pulley shafts at corresponding ends of the two pulley supporting frames. The said shaft 33 is provided at one end with a belt pulley 35, and is rotatively mounted in the bearings 17 carried by said frames and in a pivoted arm 36, as shown in Fig. 1. The bearings 17 are fixed to the frame by means of the bolts shown so as to permit the bearings to turn about the axes of the bolts, and the shaft 33 is adapted to slide endwise in the bearings 17 and the pulleys 34 so as to permit the pulley frames to change their angle to the shaft 33; the said shaft pivoting about the contact points of the beveled gears 34 and 29.

The strips $a, a$ from which the tube A is formed are wrapped spirally about the mandrel, one over and the other under the mandrel in such manner as to break joints between the margins of the strips, as shown in Fig. 4. The tube thus formed is adjusted between the forward belt 21 and the mandrel, and the spiral movement of the belt serves to rotate the tube to wrap the strips about the mandrel and to advance the tube along the mandrel toward the rear end thereof. In practice a suitable cutting device, as a saw is located at the rear end of the mandrel to cut the tube in suitable lengths.

The machine, as thus far described, may be of any well known or preferred construction, embracing a forming mandrel with means for forming the tube thereon and for advancing it therealong and such construction constitutes, in itself, no part of the present invention.

Referring now to the improvements to which the present invention relates and to the construction of the machine in which the invention is shown as embodied, the same are made as follows: The mandrel may be made hollow throughout a part or the whole of its length, it being shown as made hollow from end to end, to constitute a chamber 38 to receive, under pressure, the mobile anti-friction medium. Said mandrel may consist of a pipe that is closed at its ends by the plugs 39, 40. Through the forward end or plug 40 extends a pipe 41 which leads from an air pump 42, or other suitable source supplying anti-friction medium under pressure. The pipe is provided with a pressure gage 43. The tubular mandrel is provided near its forward end with an opening 44 which leads from the chamber 38 to the outer side of the mandrel. Said opening preferably leads into an obliquely disposed groove 45 on the circumference of the mandrel, the said groove being directed toward the rear end of the mandrel. The said discharge opening and groove are located between the forwardmost forming and advancing belt and the point at which the strips a, a are brought together on the mandrel to form the tube A.

It will thus be seen that air, or other mobile or flowable anti-friction medium, which is forced into the chambered mandrel, is discharged outwardly through the opening 44 and the oblique groove 45 into the space between the forming tube and the mandrel, and that the oblique disposition of the groove has the effect to direct the air rearwardly between the tube and mandrel toward the rear end of the latter, and to also give the current of the flowing anti-friction medium a tendency to follow a spiral path about the mandrel toward the rear end thereof so as to form an annular film between the tube and mandrel.

It will thus be seen that I have provided means for introducing a thin film of the anti-friction medium between the mandrel and tube which reduces or overcomes the friction between said parts, and prevents the mandrel from becoming heated. It will also be observed that this result may be effected without the use of a lubricant, such as tallow or the like, the presence of which on the inner side of the tube may be objectionable. Furthermore the anti-friction medium is thus applied automatically, requiring no manual labor in its application.

It will be obvious that the air under pressure may be supplied from any suitable or convenient source at hand, and that such pressure may be regulated, as by means of the valve 46 shown in the pipe 41 to suit the requirements. It will be furthermore apparent that the details of the construction may be otherwise varied without departing from the spirit of the invention, and the invention is not limited to such details except as hereinafter made the subject of specific claims.

I claim as my invention:—

1. In a tube forming machine, the combination with a forming member with means for forming a tube thereon and advancing the tube therealong, of means for continuously delivering a mobile anti-friction medium under pressure between the tube and forming member during the formation of the tube and directing it along the path of movement of the tube.

2. In a tube forming machine, the combination with a forming member with means for forming a tube thereon and advancing the tube therealong, of means for continuously delivering under pressure a mobile anti-friction medium between the tube and forming member during the formation of the tube.

3. In a tube forming machine, the combination with a forming member, with means for forming a tube thereon and advancing the tube therealong, of means for continuously delivering air under pressure between the forming member and the advancing tube during the formation of the tube to reduce the friction between the same.

4. In a tube forming machine, the combination with a hollow forming mandrel and means for forming a tube thereon and advancing the tube along the mandrel, of means for delivering an anti-friction medium under pressure to said hollow mandrel, said mandrel being provided with an opening arranged to continuously deliver the compressed anti-friction medium into the space between the advancing tube and mandrel.

5. The combination with a chambered forming member and means for forming a tube thereon and advancing the tube therealong, of a pump for delivering a mobile anti-friction medium to the chamber of said member, said chambered member being provided with an opening arranged to continuously deliver said medium under pressure from said chamber between the member and the advancing tube.

6. The combination with a hollow forming member and means for forming a tube thereon and advancing the tube therealong, of means for delivering a mobile anti-friction medium under pressure to said hollow forming member, said hollow forming member being provided with an opening terminating on the circumference of said member in an oblique slit arranged to continuously deliver the anti-friction medium under pressure from the interior of said member to the space between the same and the advancing tube and in the direction of travel of said tube.

In testimony, that I claim the foregoing as my invention I affix my signature in the presence of two witnesses, this 6th day of September A. D. 1910.

PAUL GUSTAV KAISER.

Witnesses:
W. L. Hall,
William Goldberger.